(12) United States Patent
Lan et al.

(10) Patent No.: US 10,448,073 B2
(45) Date of Patent: Oct. 15, 2019

(54) POPPING-SCREEN PUSH SYSTEM AND METHOD

(71) Applicant: Shanghai Hode Information Technology Co.,Ltd., Shanghai (CN)

(72) Inventors: Fan Lan, Shanghai (CN); Yuxing Wang, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 161 days.

(21) Appl. No.: 15/663,567

(22) Filed: Jul. 28, 2017

(65) Prior Publication Data

US 2018/0035143 A1   Feb. 1, 2018

(30) Foreign Application Priority Data

Jul. 29, 2016   (CN) .......................... 2016 1 0606803

(51) Int. Cl.
*G06F 3/14* (2006.01)
*H04N 21/254* (2011.01)
*H04N 21/266* (2011.01)
*H04N 21/81* (2011.01)

(52) U.S. Cl.
CPC ......... *H04N 21/254* (2013.01); *H04N 21/266* (2013.01); *H04N 21/8126* (2013.01)

(58) Field of Classification Search
CPC ....................................................... G06F 3/14
USPC ................ 715/808; 705/7.32, 26.1; 370/352; 463/30; 348/500; 725/62
See application file for complete search history.

(56) References Cited

U.S. PATENT DOCUMENTS

| | | | |
|---|---|---|---|
| 7,277,424 B1 * | 10/2007 | Dowling | H04M 3/5191 370/352 |
| 7,809,773 B2 | 10/2010 | Horowitz et al. | |
| 8,019,815 B2 | 9/2011 | Keener et al. | |
| 8,376,910 B2 | 2/2013 | Cheung et al. | |
| 8,545,369 B2 | 10/2013 | Cheung et al. | |
| 8,555,177 B1 | 10/2013 | Junee et al. | |
| 8,628,414 B2 | 1/2014 | Walker et al. | |
| 8,701,153 B2 | 4/2014 | Abrams | |
| 9,003,306 B2 | 4/2015 | Mehin et al. | |
| 9,253,225 B1 | 2/2016 | Junee et al. | |

(Continued)

FOREIGN PATENT DOCUMENTS

| | | |
|---|---|---|
| CN | 105357587 A | 2/2016 |
| CN | 105435453 A | 3/2016 |

*Primary Examiner* — Ruay Ho
(74) *Attorney, Agent, or Firm* — BakerHostetler (57) ABSTRACT

The present invention discloses a popping-screen push system which includes: a popping-screen server which receives a text or image information, transfer it into a popping-screen message, stores and manages the popping-screen message, and adds it into a broadcast request; a broadcasting server which receives a broadcast request from the popping-screen server and sends out the popping-screen message in the broadcast request in real time; a popping-screen player which receives the popping-screen message from the broadcast server, downloads and plays the popping-screen. The present invention is provided with a broadcasting server, and provides identification codes for respective popping-screen messages, videos, and popping-screen players. Thus, it is convenient for popping-screen management and thereby realizes a high efficiency of polling for users and the popping-screens.

13 Claims, 3 Drawing Sheets

(56) References Cited

U.S. PATENT DOCUMENTS

| | | |
|---|---|---|
| 9,332,315 B2 | 5/2016 | Agrawal |
| 9,467,408 B1 | 10/2016 | Sherman-Presser et al. |
| 2004/0093257 A1* | 5/2004 | Rogers ............... G06Q 30/02 705/7.32 |
| 2009/0249223 A1 | 10/2009 | Barsook et al. |
| 2010/0075751 A1* | 3/2010 | Garvey ............... G06Q 10/06 463/30 |
| 2012/0331496 A1 | 12/2012 | Copertino et al. |
| 2013/0076981 A1* | 3/2013 | Labrozzi ............... H04N 5/04 348/500 |
| 2013/0325644 A1* | 12/2013 | Sivaraman ......... G06Q 30/0633 705/26.1 |
| 2013/0326352 A1 | 12/2013 | Morton |
| 2014/0012910 A1 | 1/2014 | White |
| 2014/0013200 A1 | 1/2014 | White |
| 2014/0081435 A1 | 3/2014 | Wagner |
| 2014/0089801 A1 | 3/2014 | Agrawal |
| 2014/0092127 A1 | 4/2014 | Kruglick |
| 2015/0082342 A1 | 3/2015 | Norwood et al. |
| 2015/0261853 A1 | 9/2015 | Shao |
| 2016/0316272 A1 | 10/2016 | Li |
| 2016/0342287 A1 | 11/2016 | Barker et al. |
| 2017/0085936 A1* | 3/2017 | Sheffler ............ H04N 21/26258 |

\* cited by examiner

POPPING-SCREEN PUSH SYSTEM AND METHOD

CROSS-REFERENCE TO RELATED APPLICATION

The present application is based on and claims priority to Chinese Patent Application No. 201610606803.0, filed on Jul. 29, 2016. The entire disclosure of the above-identified application is hereby incorporated by reference herein and made a part of this specification. The contents of the related U.S. patent application Ser. No. 15/456,319, filed on Mar. 10, 2017, and U.S. patent application Ser. No. 15/456,225, filed on Mar. 10, 2017, are also hereby incorporated by reference in their entirety.

FIELD OF THE INVENTION

This application is related to a technology of pushing popping-screen, and more particularly, to a popping-screen push system and method.

BACKGROUND OF THE INVENTION

With the development and needs for user interaction, the popping-screen (sometimes referred to as "bullet screen") technology enhances interchange and interactivity between users. Users can rely on real-time popping-screen system to achieve a need for interaction in popping-screen or communication. The real-time feature of the popping-screen provides a new way for information display.

The existing popping-screen push technology is provided with a popping-screen server and a player, the real-time popping-screen is achieved by polling the popping-screen server, the efficiency thereof is relatively low.

SUMMARY OF THE INVENTION

The present invention provides a popping-screen push system and a method, to realize an interaction between users through the popping-screen, and the management of the popping-screen is convenient.

In order to reach the above purpose, the present invention provides a popping-screen push system being characterized by comprising a popping-screen server, a broadcasting server, and a popping-screen player: wherein the popping-screen server receives a text or image information from the popping-screen player, and transfers it into a popping-screen message, stores and manages the popping-screen message, and adds the popping-screen message into a broadcast request; wherein the broadcasting server which receives the broadcast request output from the popping-screen server and sends out the popping-screen message contained in the broadcast request in real time; and wherein the popping-screen player receives the popping-screen message sent from the broadcast server, downloads and plays the popping-screen message.

The above popping-screen player comprises other user's popping-screen players, the other user's popping-screen players connect to and play a video and upload a video identification code of the video to a broadcasting server, wherein the video is preset with the video identification code and is corresponding to the text or image information; wherein the broadcasting server sends out the popping-screen message to the other user's popping-screen players connected to the video in according with the video identification code.

The above popping-screen player can be a personal computing (PC) device, a mobile terminal, a virtual reality (VR) equipment.

The present invention further provides a popping-screen push method, being characterized by comprising: a popping-screen player connecting to and playing a video, wherein the video is preset with a video identification code; the popping-screen player uploading the video identification code of the video to a broadcasting server. Furthermore, the popping-screen player receiving a text or image information, and uploads the text or image information and the video identification code of the video to a popping-screen server. The popping-screen server transferring the text or image information into a popping-screen message, and sending out the popping-screen message and the corresponding video identification code to the broadcasting server in the form of a broadcast request.

The broadcasting server broadcasts, by having received the broadcast request, the popping-screen message to each popping-screen player connected to the corresponding video in according with respective video identification code.

The popping-screen player plays the received popping-screen message.

The popping-screen player and the broadcasting server are connected continually when the popping-screen player is connected to and playing the video.

The popping-screen player and the broadcasting server get a match by means of the video identification code of the video connected to the popping-screen player, and the broadcasting server treats the number of popping-screen players that are matched with a same video identification code as the number of on-line users of the video, and broadcasts, in real time, the number of on-line users of the video.

The popping-screen player regularly, by time, sends a request for a heard rate to the broadcasting server when it is playing the video, and the broadcasting server feedbacks the number of on-line users of the video connected by the popping-screen player.

The step of the popping-screen server handling the text or image information uploaded by the popping-screen player includes: conducting a verification operation including a filtering for sensitive wording, a determination for user authorization, and a determination for the setting of a popping-screen of the video; transferring the text or image information into a popping-screen message after the verification is passed, and storing the popping-screen message into a database; and adding the popping-screen message into a popping-screen list and renewing a buffer for storing the popping-screen list.

The popping-screen player receives the popping-screen messages sent from the broadcasting server, and displays, during the process of playing the video, each popping-screen message in the popping-screen list in accordance with respective corresponding time message, and the popping-screen player also displays the popping-screen list in which the each popping-screen message is arranged by time sequence.

The popping-screen player renews the displayed popping-screen list based upon a new popping-screen message once it has received the new popping-screen message.

A local popping-screen player directly stores the popping-screen message sent by itself into its own popping-screen list after the popping-screen is sent out, and the popping-screen is sent to other user's popping-screen players by means of the broadcasting server.

Respective popping-screen messages have respective different popping-screen identification codes.

Respective popping-screen players have respective different player identification codes.

In comparison with conventional technology, the popping-screen push system and method according to the present invention has advantages in that the present invention provides a popping-screen push system or a real time popping-screen theatre, that a user can link to the popping-screen server by means of electronic terminal to get and push a real time popping-screen, and that a user can transmit a popping-screen to the popping-screen server by means of electronic terminal so as to do broadcast of a same video.

The present invention provides a unique and random identification code for respective popping-screen, video, and popping-screen player, and thus can differentially manage each popping-screen, each video, and each popping-screen player.

The present invention can realize, by means of the video identification code, a popping-screen message sent by a popping-screen player connected to a specific video and can do broadcasting displays in all popping-screen players connected to said video.

The present invention is provided with a broadcasting server and can realize a high efficiency of polling for users and the popping-screens.

DETAILED DESCRIPTION OF THE INVENTION

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure. It can be realized that the terms "first" and "second" are configured for describing each element, and the elements are not limited by the terms. These terms merely distinguish the elements.

Figure 1:
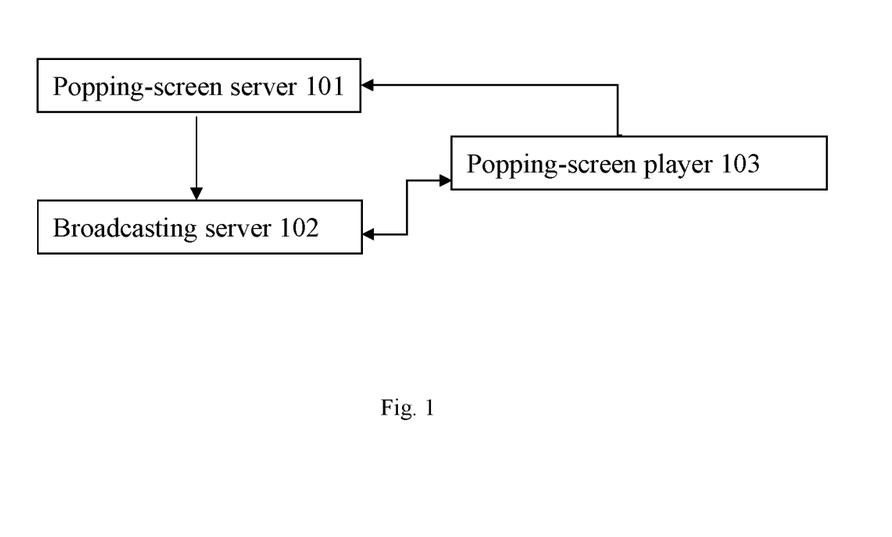
FIG. 1 is a block diagram of the popping-screen push system according to an embodiment of the present invention.

As shown in FIG. 1, the present invention discloses a popping-screen push system which includes a popping-screen server 101, a broadcasting server 102, and a popping-screen player 103.

The popping-screen server 101 is used to receive a text or image information which is intended to be displayed by popping-screen push, and to transfer said information into a popping-screen message. Meanwhile, the popping-screen server 101 also stores and manages the popping-screen message and adds the popping-screen message into a broadcast request.

Furthermore, the popping-screen server 101 creates a popping-screen list consisting of one or more popping-screen messages. The popping-screen list, an identification code consists of the broadcast request.

The broadcasting server 102 communicates with the output of the popping-screen server 101, receives the broadcast request sent from the popping-screen server 101, and sends out the popping-screen message contained in the broadcast request in real time. The broadcasting server 102 conducts a real time broadcast for users of respective video.

Popping-screen player 103 communicates with the broadcasting server 102 in bi-direction, and has an output terminal connected to the popping-screen server 101. The popping-screen player 103 receives the popping-screen message sent from the broadcasting server 102, and downloads and plays the popping-screen based upon the popping-screen message. The popping-screen player 103 further receive the text or image information edited by user for displaying in the popping-screen and sends it to popping-screen server 101.

The popping-screen player 103 can be a PC, a mobile terminal, a VR device or any electronic output terminal.

Figure 2:
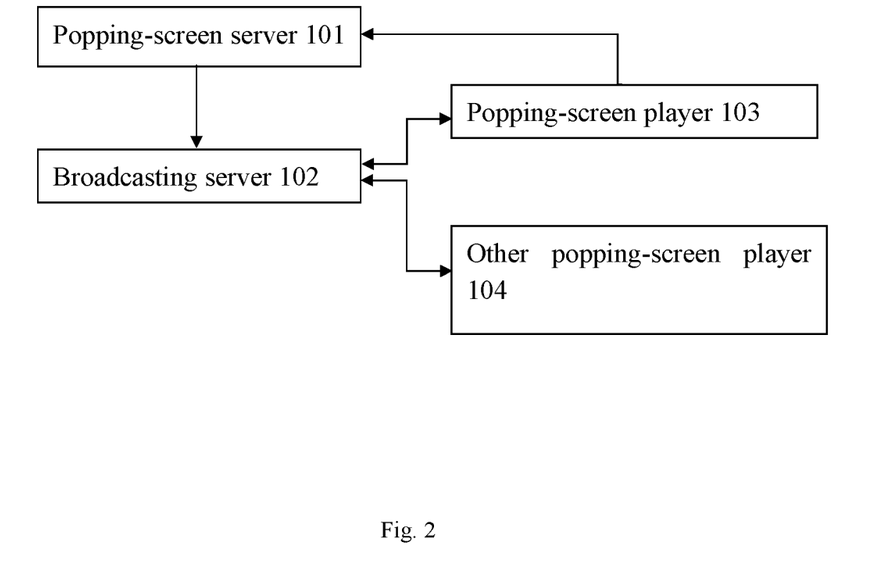
FIG. 2 is a block diagram of the popping-screen push system according to another embodiment of the present invention.

As shown in FIG. 2, the present invention discloses a popping-screen push system which includes a popping-screen server 101, a broadcasting server 102, and popping-screen player 103, and other user's popping-screen players 104.

The other user's popping-screen players 104 connect to and play a video and upload a video identification code of the video to the broadcasting server 102. The video is preset with the video identification code and is corresponding to the text or image information. The broadcasting server 102 sends out the popping-screen message to the other user's popping-screen players 104 connected to the video in according with the video identification code.

Figure 3:
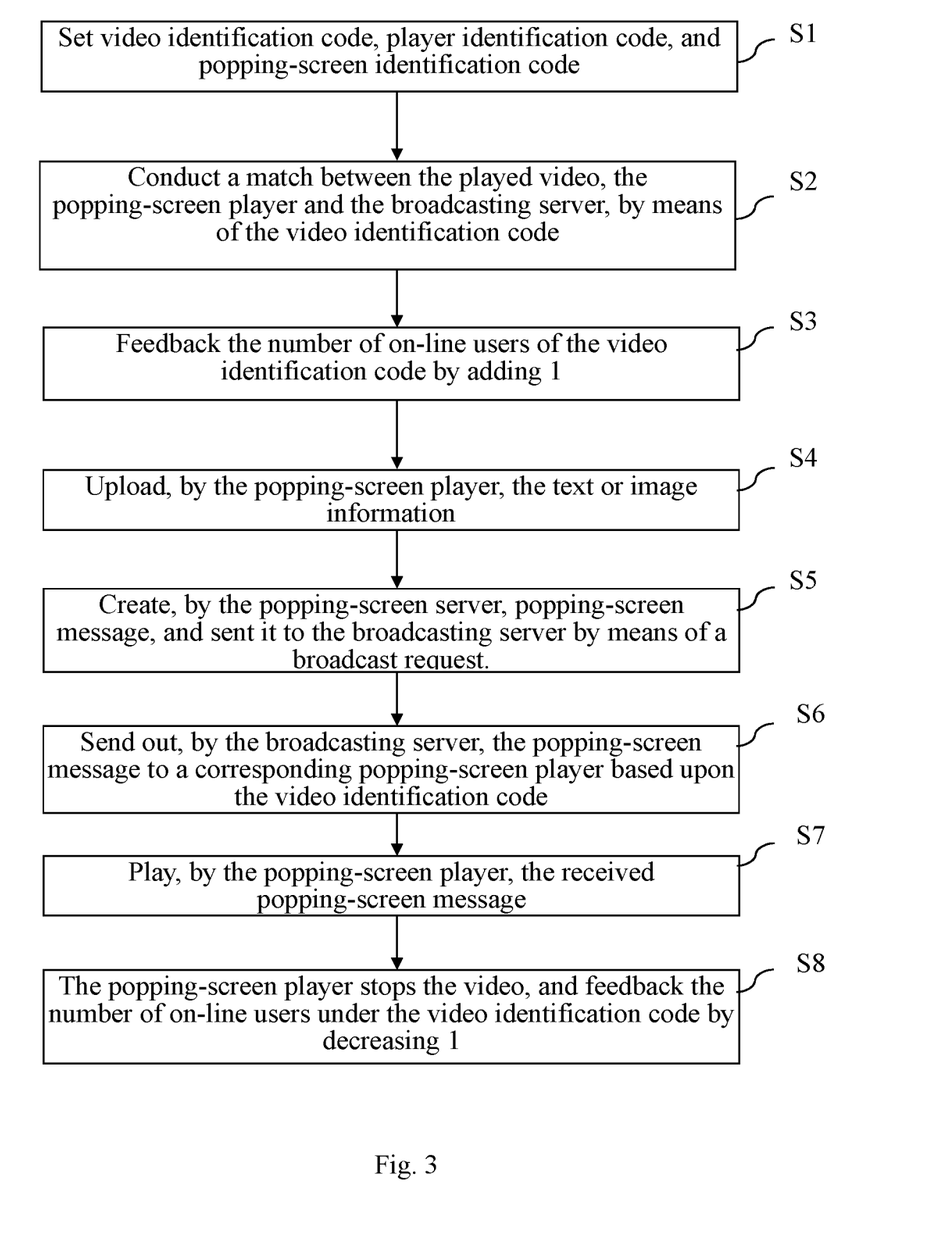
FIG. 3 is a flow chat of the popping-screen push method according to an embodiment of the present invention.

As shown in FIG. 3, the present invention further discloses a popping-screen push method which comprises the following steps.

S1: setting a random video identification code (cid) for respective video, setting a random user identification code or player identification code (mid) for respective user or respective popping-screen player, and setting a random popping-screen identification code (did) for respective popping-screen created by the popping-screen server 101.

The popping-screen identification codes (did) have different IDs for different popping-screens for the purpose of managing respective popping-screens. The video identification code (cid) means a ID for a video to which a popping-screen belongs. All popping-screens belonging to a same video have a same "cid." "cid" is used to get a popping-screen list under a video. The user identification codes or player identification codes (mid) are used to transmit a user ID for a popping-screen.

S2: connecting the popping-screen player and playing a video. There is a continue connection, using xmlsocket for Flash and using websocket for H5, between the popping-screen player and the broadcasting server when the popping-screen player is connected and playing a video. Popping-screen player uploads the video identification code of the video to the broadcasting server. The broadcasting server combines and stores the player identification code of the popping-screen player and the video identification code of the video being connected to the popping-screen player. That is, the situation of connecting the popping-screen player is input to a channel corresponding to the video identification code.

S3: reporting, by the broadcasting server, the number of on-line users in the channel corresponding to the video identification code (cid), i.e., the number of on-line user in the video broadcasted by the broadcasting server.

Specifically, the popping-screen player and the broadcasting server get a match by means of the video identification code of the video connected to the popping-screen player. The broadcasting server treats the number of popping-screen players that are matched with a same video identification code as the number of on-line users under such video, and broadcasts, in real time, the number of on-line users under each video.

Once a popping-screen player has played a video and matched with a broadcasting server, the broadcasting server adds 1 to the number of on-line users under the video identification code and feedbacks it.

Furthermore, the popping-screen player will regularly, by time, send a request for a heard rate to the broadcasting server when it is playing a video. And, the broadcasting server will feedback the number of on-line users under the video connected by the popping-screen player.

S4: receiving, by popping-screen player, a text or image information. The text or image information is uploaded to the popping-screen server (http post) along with a video identification code corresponding to the video.

S5: receiving, by the popping-screen server, the text or image information. The text or image information will be verified for a series of criteria first, including a filtering for sensitive wording, a determination for user authorization, and a determination for setting the video and the popping-screen. Once the verification is passed, the text or image information is transferred into a popping-screen message and it is stored into a database, and a buffer for storing the popping-screen list is renewed. The popping-screen message and a corresponding video identification code then is sent to the broadcasting server by means of the broadcast request.

In this embodiment, the popping-screen server combines all popping-screens under a same video into a real time renewed popping-screen list based upon a video identification code. Each popping-screen under a same video includes a time message related to the display timing of the popping-screen during the course of playing the video. The popping-screen list and its corresponding video identification code, as well as a popping-screen identification code corresponding to respective popping-screen constitute the popping-screen message. The popping-screen message and the message of request constitute a broadcast request to be sent to the broadcasting server.

S6: sending out the popping-screen message to respective popping-screen player corresponding to a player identification code associated with the video identification code, based upon the video identification code in the popping-screen message, once the broadcasting server has received the broadcast request.

S7: playing, by the broadcasting server, the received popping-screen message.

The popping-screen player receives the popping-screen messages sent from the broadcasting server, and displays, during the course of playing the video, each popping-screen in the popping-screen list in accordance with respective corresponding time message.

In the meanwhile, the popping-screen player also displays the popping-screen list. Each popping-screen in the displayed popping-screen list is arranged by time sequence.

Once the popping-screen player has received a new popping-screen message, the displayed popping-screen list will be renewed based upon the new popping-screen message.

The purpose of displaying the popping-screen list by the popping-screen player is for user to review all historical popping-screens under this video. There are two sources for the popping-screen: 1) reading historical popping-screens in the broadcasting server, i.e., popping-screen sent by all other users; 2) storing, under a sequential arrangement by time schedule, popping-screens sent by each user or local popping-screen player itself. Therefore, a local popping-screen player will directly store the popping-screen sent by itself into its own popping-screen list and popping-screen message after the popping-screen is sent out. The popping-screen will be sent to other user's popping-screen players by means of the broadcasting server. Thus, there is no need to send the popping-screens to its own popping-screen list by means the broadcasting server.

Furthermore, the popping-screen player will check, after receiving the popping-screen message sent by the broadcasting server, whether the player identification code or the user identification code, being a random ID, of the popping-screen message is identical to the player identification code or user identification code of the its own player. If identical, it means it is its own popping-screen, and it can do a special display for the popping-screen sent by itself. If not identical, it means it is a popping-screen sent by the other.

S8: disconnecting the broadcasting server when the popping-screen player stops the connected video. The broadcasting server decrease the number of on-line users in the "cid" channel of the popping-screen player by 1, and go back to connect a popping-screen player and a user under the video, during a real time broadcast for the number of on-line user.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network.

Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 4:
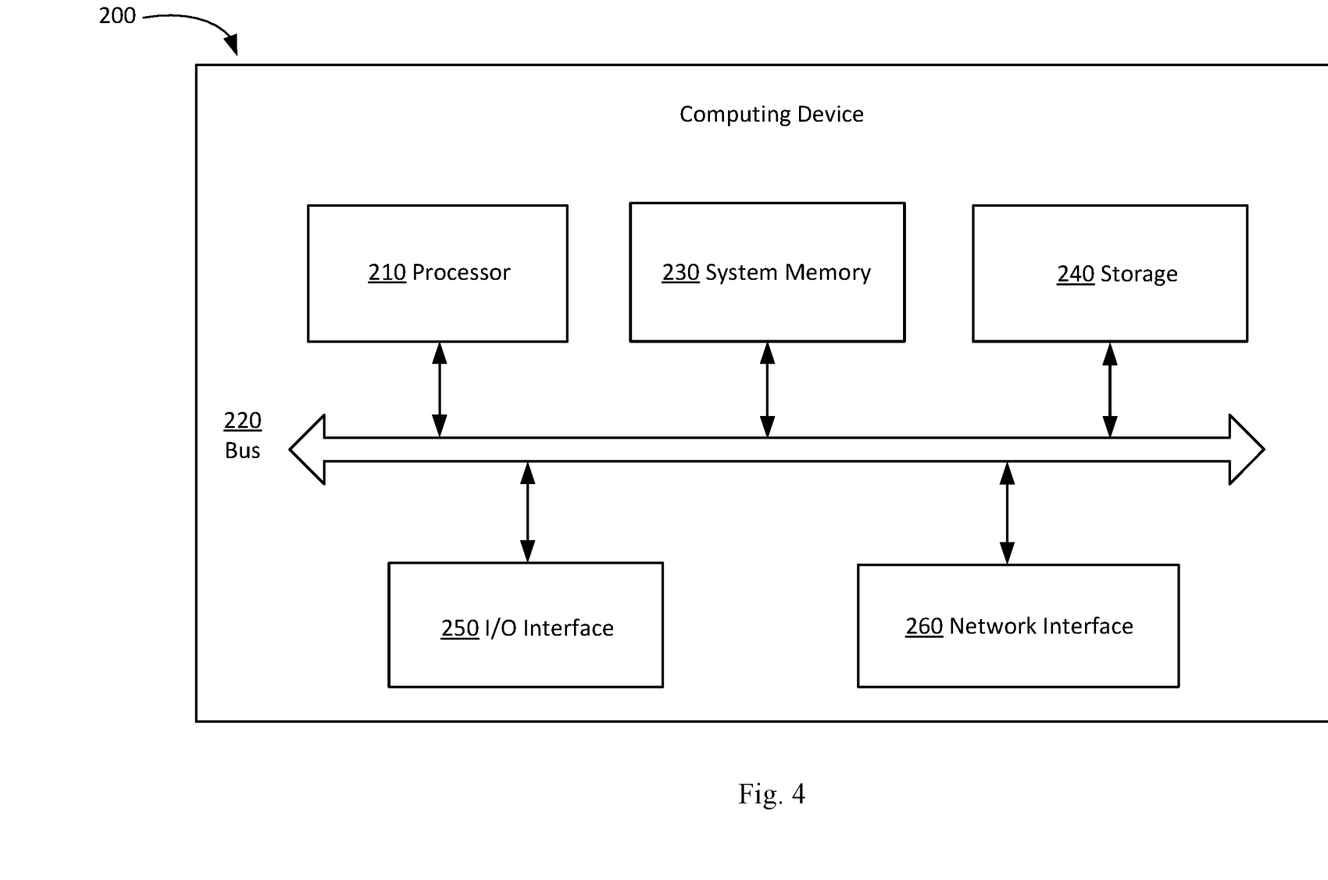
FIG. 4 is a diagram illustrating an example computing system that may be used in some embodiments.

In at least some embodiments, a server or computing device that implements a portion or all of one or more of the technologies described herein, including the techniques to implement the functionality of the popping-screen server 101, the broadcasting server 102, the popping-screen player 103 and the other popping-screen player 104, may include a general-purpose computer system that includes or is configured to access one or more computer-accessible media. FIG. 4 illustrates such a general-purpose computing device 200. In the illustrated embodiment, computing device 200 includes one or more processors 210 (which may be referred herein singularly as "a processor 210" or in the plural as "the processors 210") are coupled through a bus 220 to a system memory 230. Computing device 200 further includes a permanent storage 240, an input/output (I/O) interface 250, and a network interface 260.

In various embodiments, the computing device 200 may be a uniprocessor system including one processor 210 or a multiprocessor system including several processors 210 (e.g., two, four, eight, or another suitable number). Processors 210 may be any suitable processors capable of executing instructions. For example, in various embodiments, processors 210 may be general-purpose or embedded processors implementing any of a variety of instruction set architectures (ISAs), such as the x86, PowerPC, SPARC, or MIPS ISAs, or any other suitable ISA. In multiprocessor systems, each of processors 210 may commonly, but not necessarily, implement the same ISA.

System memory 230 may be configured to store instructions and data accessible by processor(s) 210. In various embodiments, system memory 230 may be implemented using any suitable memory technology, such as static random access memory (SRAM), synchronous dynamic RAM (SDRAM), nonvolatile/Flash-type memory, or any other type of memory.

In one embodiment, I/O interface 250 may be configured to coordinate I/O traffic between processor 210, system memory 230, and any peripheral devices in the device, including network interface 260 or other peripheral interfaces. In some embodiments, I/O interface 250 may perform any necessary protocol, timing, or other data transformations to convert data signals from one component (e.g., system memory 230) into a format suitable for use by another component (e.g., processor 210). In some embodiments, I/O interface 250 may include support for devices attached through various types of peripheral buses, such as a variant of the Peripheral Component Interconnect (PCI) bus standard or the Universal Serial Bus (USB) standard, for example. In some embodiments, the function of I/O interface 250 may be split into two or more separate components, such as a north bridge and a south bridge, for example. Also, in some embodiments some or all of the functionality of I/O interface 250, such as an interface to system memory 230, may be incorporated directly into processor 210.

Network interface 260 may be configured to allow data to be exchanged between computing device 200 and other device or devices attached to a network or network(s). In various embodiments, network interface 260 may support communication via any suitable wired or wireless general data networks, such as types of Ethernet networks, for example. Additionally, network interface 260 may support communication via telecommunications/telephony networks such as analog voice networks or digital fiber communications networks, via storage area networks such as Fibre Channel SANs or via any other suitable type of network and/or protocol.

In some embodiments, system memory 230 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 200 via I/O interface 250. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 200 as system memory 230 or another type of memory.

Further, a computer-accessible medium may include transmission media or signals such as electrical, electromagnetic or digital signals, conveyed via a communication medium such as a network and/or a wireless link, such as may be implemented via network interface 260. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A popping-screen push system comprising a popping-screen server and a broadcasting server;
   wherein the popping-screen server receives a text or image information from a first client computing device connecting to and playing a video, transfers it into a popping-screen message, stores and manages the popping-screen message, and adds the popping-screen message into a broadcast request;
   wherein the broadcasting server receives the broadcast request from the popping-screen server and sends out the popping-screen message contained in the broadcast request in real time to a plurality of client computing devices connecting to and playing the video;
   wherein the plurality of client computing devices receive and display the popping-screen message included in a popping-screen list, the popping-screen list comprising a plurality of popping-screen messages arranged based on a time sequence;
   wherein the plurality of client computing devices renew the popping-screen list upon receiving a new popping-screen message; and
   wherein the first client computing device directly stores the text or image information into its own popping-screen list, and the text or image information included in the popping-screen message is sent to other client computing devices among the plurality of computing devices by means of the broadcasting server.

2. The popping-screen push system according to claim 1, wherein the first client computing device and the other client computing devices upload a video identification code of the video to the broadcasting server, wherein the video is preset with the video identification code and is corresponding to the text or image information.

3. The popping-screen push system according to claim 1, wherein the broadcasting server identifies a number of on-line users of the video who are connecting to and playing the video, and broadcasts in real time the number of the on-line users of the video.

4. The popping-screen push system according to claim 1, wherein the popping-screen server conducts a verification operation including a filtering for sensitive wording, a determination for user authorization, and a determination for setting of a popping-screen of the video;
wherein the popping-screen server generates the popping-screen message after the verification is passed, stores the popping-screen message into a database; and
wherein the popping-screen server adds the popping-screen message into the popping-screen list and renews a buffer for storing the popping-screen list.

5. The popping-screen push system according to claim 1, wherein the plurality of popping-screen messages have their respective popping-screen identification codes.

6. The popping-screen push system according to claim 1, wherein the plurality of client computing devices have their respective player identification codes.

7. A popping-screen push method, comprising:
a first client computing device connecting to and playing a video, wherein the video is preset with a video identification code;
uploading, by the first client computing device, the video identification code of the video to a first server computing device;
receiving and uploading, by the first client computing device, a text or image information and the video identification code of the video to a second server computing device;
generating, by the second server computing device, a popping-screen message based on the text or image information;
sending, by the second server computing device, the popping-screen message and the video identification code to the first server computing device in a form of a broadcast request;
sending, by the first server computing device, the popping-screen message to a plurality of client computing devices connected to the video based on the video identification code after the broadcast request is received by the first server computing device;
displaying, by the plurality of client computing devices, the popping-screen message included in a popping-screen list;
wherein the popping-screen list comprises a plurality of popping-screen messages arranged based on a time sequence;
wherein the plurality of client computing devices renew the popping-screen list upon receiving a new popping-screen message; and
wherein the first client computing device directly stores the text or image information into its own popping-screen list, and the text or image information included in the popping-screen message is sent to other client computing devices among the plurality of computing devices by means of the first server computing device.

8. The popping-screen push method according to claim 7, wherein each of the plurality of client computing devices and the first server computing device are connected continually when each of the plurality of client computing devices connects to and playing the video.

9. The popping-screen push method according to claim 8, wherein the first server computing device identifies a number of on-line users of the video who are connecting to and playing the video, and broadcasts, in real time, the number of the on-line users of the video, and
wherein each of the plurality of client computing devices regularly sends a request for the number of on-line users of the video to the first server computing device when it is playing the video, and the first server computing device feedbacks the number of on-line users of the video to each of the plurality of client computing devices.

10. The popping-screen push method according to claim 7,
wherein the first server computing device identifies a number of on-line users of the video who are connecting to and playing the video, and broadcasts, in real time, the number of the on-line users of the video, and
wherein each of the plurality of client computing devices regularly sends a request for the number of on-line users of the video to the first server computing device when it is playing the video, and the first server computing device feedbacks the number of on-line users of the video to each of the plurality of client computing devices.

11. The popping-screen push method according to claim 7, further comprising:
conducting, by the second server computing device, a verification operation including a filtering for sensitive wording, a determination for user authorization, and a determination for setting of a popping-screen of the video;
generating, by the second server computing device, the popping-screen message after the verification is passed, and storing, by the second server computing device, the popping-screen message into a database; and
adding, by the second server computing device, the popping-screen message into the popping-screen list and renewing, by the second server computing device, a buffer for storing the popping-screen list.

12. The popping-screen push method according to claim 7, wherein the plurality of popping-screen messages have their respective popping-screen identification codes.

13. The popping-screen push method according to claim 7, wherein the plurality of client computing devices have their respective player identification codes.

* * * * *